Oct. 28, 1941.  F. MARTIN  2,260,574

VEHICLE WHEEL MOUNTING DEVICE

Filed July 27, 1940

Frank Martin
INVENTOR

BY Victor J. Evans & Co.
ATTORNEYS

Patented Oct. 28, 1941

2,260,574

UNITED STATES PATENT OFFICE 2,260,574

VEHICLE WHEEL MOUNTING DEVICE

Frank Martin, Clovis, N. Mex.

Application July 27, 1940, Serial No. 347,957

1 Claim. (Cl. 280—124)

This invention relates to vehicle wheel mounting devices, and its general object is to provide a device that is primarily designed for trailers and agricultural implements and machinery, such as harvesters and the like, and for substituting tandem dual wheels for a single wheel, the wheel carrying means being pivoted between its ends and preferably to the single wheel axle, for rocking movement, with a wheel journaled at each end of said means and the latter being yieldably held and equally balanced for disposal normally parallel to the vehicle frame, thus it will be seen that my device allows free travel of the vehicle over irregular and rough roadways, as well as obstructed areas, such as ridged fields or the like, with minimum shock and strain to the vehicle, thereby resulting in materially prolonging the life thereof and reducing repairs thereto.

A further object is to provide a mounting device of the character set forth, that can be installed on vehicles with minimum change thereto, and the device is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
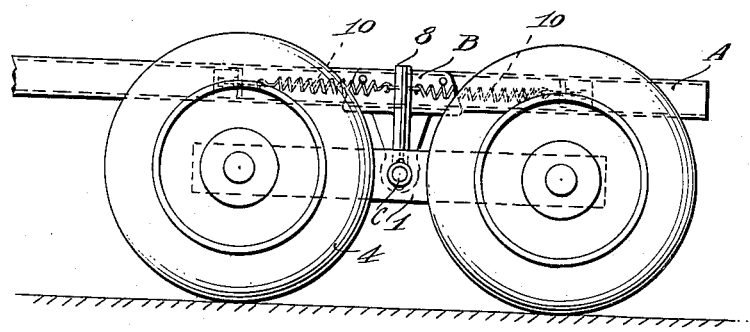
Figure 1 is a side elevation illustrating my devices installed on a vehicle chassis.

Referring to the drawing in detail, the letter A indicates a vehicle frame which may be that of a trailer or agricultural machine, but in any event the frame has secured to and depending therefrom bearing brackets B for the axle C.

It will of course be obvious that the device is duplicated on opposite sides of the frame, and each device includes a beam 1 which may be of a solid bar type as shown, or of a channel type. However, the beam 1 has fixed to its outer face at the ends thereof blocks 2 having stub axles or spindles 3 formed thereon or otherwise secured thereto, the spindles being arranged parallel to each other and to have journaled thereon, wheels 4 for disposal one in advance of the other or in tandem arrangement, and it will be noted that the wheels in the form shown are equipped with pneumatic tires.

Fixed to and extending through the beam 1 midway its ends is a sleeve or tubular member 5 to be mounted on the axle C for rocking movement of the beam, as will be apparent. The sleeve 5 is held on the axle C against the bearing B by any suitable means, and I have illustrated an abutment collar 7 pinned to the axle, for that purpose.

Figure 2:
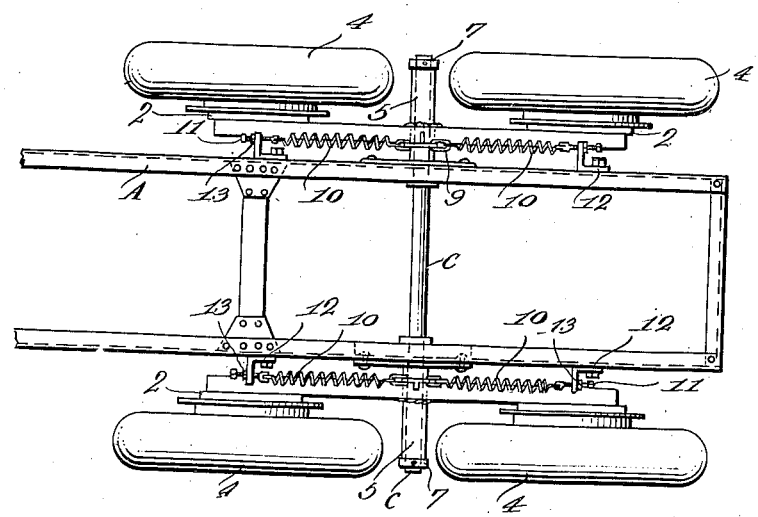
Figure 2 is a top plan view thereof.
Figure 3:
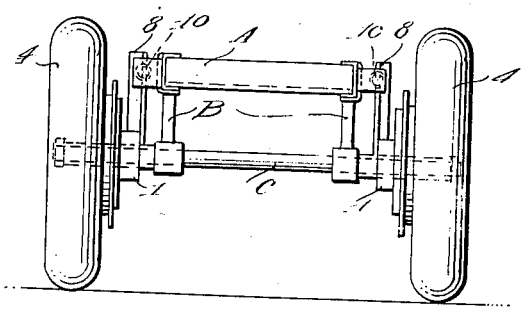
Figure 3 is a rear view.
Figure 4:
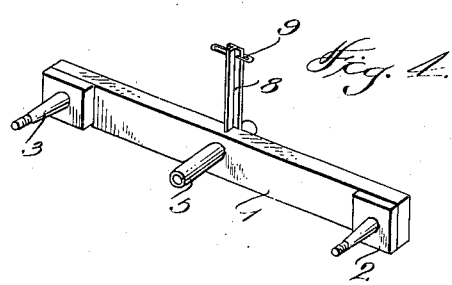
Figure 4 is a perspective view of the wheel carrying means.

Fixed to and rising from the sleeve 5 inwardly of the beam, as well as fixed to the latter midway its ends is an upright 8 of cross sectional T-shape, in the form shown, and connected to the upper end of the upright 8 upon opposite sides thereof are links 9 which have one of the ends of coil springs 10 connected thereto, while their opposite ends are connected to the eyed ends of bolts 11 that are threaded in angle brackets 12 fixed to the side of the frame A, as clearly shown in Figure 2. By the use of the bolts 11 it will be obvious that the springs can be adjusted and they are held adjusted by lock nuts 13.

From the above description and the disclosure in the drawing, it will be further obvious that the springs 10 yieldably hold and equally balance the beams 1 for disposal normally parallel to the side members of the frame A, but when the vehicle is travelling over an irregular surface, the wheels will follow the obstructions of said surface and bring about rocking movement of the beams against the action of the springs and said rocking movement together with the absorbing qualities of the springs will reduce the transmittal of shocks and jars to the vehicle body to a minimum.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A mounting device for vehicle wheels, comprising an axle secured to and bridging the side members of the frame of the vehicle, beams arranged upon opposite sides of the frame, sleeves fixed to and extending through the beams midway their ends, said sleeves mounted on the axle for rocking movement of the beams, blocks fixed to the outer faces of the beams at the ends thereof, spindles secured to and extending centrally from the blocks for receiving wheels in tandem arrangement, cross sectional T-shaped uprights fixed to and rising from the sleeves and the inner faces of the beams, links secured to the uprights and extending from the opposite sides thereof adjacent their upper ends, angle brackets secured to the frame upon opposite sides of the axle, eyed bolts threaded through the brackets, springs having one of their ends connected to the eyes of the bolts and their opposite ends to the links for yieldably holding the beams normally parallel to the frame, said bolts adapted to adjust the springs, and lock nuts on the bolts for holding the latter in adjusted positions.

FRANK MARTIN.